(12) United States Patent
Shimizu

(10) Patent No.: US 9,072,067 B2
(45) Date of Patent: Jun. 30, 2015

(54) COMPUTER-READABLE MEDIUM, INFORMATION PROCESSING APPARATUS, INFORMATION PROCESSING SYSTEM AND INFORMATION PROCESSING METHOD

(71) Applicant: NINTENDO CO., LTD., Kyoto (JP)

(72) Inventor: Takao Shimizu, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 56 days.

(21) Appl. No.: 13/859,164

(22) Filed: Apr. 9, 2013

(65) Prior Publication Data

US 2013/0267245 A1 Oct. 10, 2013

(30) Foreign Application Priority Data

Apr. 9, 2012 (JP) .................................. 2012-88584

(51) Int. Cl.
*H04W 64/00* (2009.01)
*G01S 5/02* (2010.01)

(52) U.S. Cl.
CPC ........... *H04W 64/003* (2013.01); *G01S 5/0236* (2013.01); *G01S 5/0242* (2013.01)

(58) Field of Classification Search
CPC ... G01S 5/0236; G01S 5/0242; H04W 64/003
USPC ........ 455/404.2, 420, 421, 422.1, 461, 456.1, 455/456.2, 457, 550.1, 556.2, 436; 370/328, 338, 329, 331
See application file for complete search history.

(56) References Cited

U.S. PATENT DOCUMENTS

| | | | |
|---|---|---|---|
| 2006/0009235 A1* | 1/2006 | Sheynblat et al. | 455/456.1 |
| 2008/0200181 A1 | 8/2008 | Zill et al. | |
| 2011/0018732 A1 | 1/2011 | Cho et al. | |
| 2011/0207474 A1 | 8/2011 | Hazzani et al. | |
| 2012/0040653 A1 | 2/2012 | Mendis | |

FOREIGN PATENT DOCUMENTS

| | | |
|---|---|---|
| EP | 1 471 688 | 10/2004 |
| JP | 2003-318921 | 11/2003 |
| WO | 02/054813 | 7/2002 |

OTHER PUBLICATIONS

Aug. 9, 2013 Search Report for EP 13162863.8, 8 pages.

* cited by examiner

*Primary Examiner* — Babar Sarwar
(74) *Attorney, Agent, or Firm* — Nixon & Vanderhye P.C.

(57) ABSTRACT

An example system causing a computer of an information processing apparatus having a wireless communication unit to function as: an installation location designating unit for designating an installation location of a beacon transmitter; an equipment specifying unit for specifying the beacon transmitter based on a field intensity of radio waves received by the wireless communication unit; and an association unit for associating the beacon transmitter specified by the equipment specifying unit with the installation location designated by the installation location designating unit.

16 Claims, 9 Drawing Sheets

*FIG. 4*

| No | Rs | CH | MAC | BcnID | BAT | ILM |
|---|---|---|---|---|---|---|
| 0 | 46 | 7 | 00:xx:xx:xx:xx:06 | 53 | 150 | 82 |
| 1 | 44 | 7 | 00:xx:xx:xx:xx:26 | 51 | 150 | 74 |
| 2 | 42 | 7 | 00:xx:xx:xx:xx:1d | 852 | 150 | 31 |
| 3 | 41 | 7 | 00:xx:xx:xx:xx:14 | 54 | 150 | 62 |
| 4 | 40 | 7 | 00:xx:xx:xx:xx:88 | 516 | 153 | 106 |
| 5 | 37 | 7 | 00:xx:xx:xx:xx:eb | 553 | 150 | 109 |

AP/BEACON POSITION REGISTRATION · 1F

←[L]   [R]→

EXIT (B)

OUTPUT FILE [START]

FIG. 6

| No | Rs | CH | MAC | BcnID | BAT | ILM |
|---|---|---|---|---|---|---|
| 0 | 44 | 7 | 00:xx:xx:xx:xx:06 | 53 | 150 | 82 |
| 1 | 43 | | | | 50 | 74 |
| 2 | 42 | | | | 50 | 31 |
| 3 | 41 | | | | 50 | 62 |
| 4 | 40 | 7 | 00:xx:xx:xx:xx:88 | 516 | 153 | 106 |
| 5 | 37 | 7 | 00:xx:xx:xx:xx:eb | 553 | 150 | 109 |

AP/BEACON POSITION REGISTRATION · 1F

AP/BEACON INSTALLATION
AP/BEACON INFORMATION IS INSTALLED AT DESIGNATED LOCATION

▼DESIGNATE LOCATION TO INSTALL▼

←[L]   [R]→

EXIT (B)

OUTPUT FILE [START]

FIG. 8

| AP/BEACON POSITION REGISTRATION · 1F | | | | | | |
|---|---|---|---|---|---|---|
| No | Rs | CH | MAC | BcnID | BAT | ILM |
| 0 | 63 | 7 | 00:xx:xx:xx:xx:1d | 852 | 150 | 31 |
| 1 | 47 | 7 | 00:xx:xx:xx:xx:06 | 53 | 150 | 82 |
| 2 | 46 | 7 | 00:xx:xx:xx:xx:eb | 553 | 150 | 109 |
| 3 | 44 | 7 | 00:xx:xx:xx:xx:26 | 51 | 150 | 74 |
| 4 | 42 | 7 | 00:xx:xx:xx:xx:14 | 54 | 150 | 62 |
| 5 | 38 | 7 | 00:xx:xx:xx:xx:88 | 516 | 153 | 106 |

▼SELECT AP/BEACON TO INSTALL▼

ID:0852 Untitled
ID:0053 Untitled
ID:0051 Untitled
ID:0054 Untitled
ID:0553 Untitled

EXIT (B)

COMPUTER-READABLE MEDIUM, INFORMATION PROCESSING APPARATUS, INFORMATION PROCESSING SYSTEM AND INFORMATION PROCESSING METHOD

This application is based upon and claims the benefit of priority of the prior Japanese Patent Application No. JP2012-088584, filed on Apr. 9, 2012, the entire contents of which are incorporated herein by reference.

FIELD

The present disclosure relates to a technique for registering an installation location of equipment transmitting radio waves.

BACKGROUND AND SUMMARY

The present disclosure employs a construction as described below. Specifically, an aspect of the present disclosure is an information processing program for causing a computer of an information processing apparatus having a radio wave receiving unit to function as: an installation location designating unit for designating an installation location of equipment transmitting radio waves; an equipment specifying unit for specifying the equipment based on a field intensity of radio waves received by the radio wave receiving unit; and an association unit for associating the equipment specified by the equipment specifying unit with the installation location designated by the installation location designating unit.

The "installation location" as used herein is not limited to a fixed position on a map. The "installation location" may be defined by which floor of a building the equipment is installed on, or by which wall or pillar in the building the equipment is installed on. Further, the "installation location" may be defined by which movable body such as a vehicle or an amusement park ride car the equipment is installed on.

According to the present disclosure, the task for registering an installation location of equipment transmitting radio waves can be simplified by specifying equipment based on a field intensity based on received radio waves and associating the specified equipment with the installation location.

The information processing program may cause the computer to further function as an identification information acquisition unit for acquiring identification information of the equipment, and the association unit may associate the equipment with the installation location by linking and registering the identification information of the equipment and information indicating the installation location.

The information indicating the installation location (installation location information) may indicate the installation location in any form. For example, the installation location may be represented by a coordinate system the origin of which indicates a predetermined point in the premise. Also, the installation location may be indicated by the number of a floor or a pillar provided in the premise, indicated by the number of a vehicle, or indicated by the number of an amusement park ride car.

The identification information acquisition unit may acquire identification information of the equipment from a signal included in the radio waves transmitted by the equipment. The acquisition of the identification information of the equipment from a signal included in the radio waves transmitted by the equipment makes it possible to simplify the task of registering the equipment transmitting its own identification information.

In general, the field intensity becomes higher as the distance to the equipment is reduced. Therefore, the equipment specifying unit may specify equipment located in the vicinity of the information processing apparatus based on the field intensity.

For example, the equipment specifying unit may specify equipment from which the radio wave receiving unit receives radio waves with the highest field intensity, as the equipment located in the vicinity of the information processing apparatus. Also, the equipment specifying unit may specify equipment from which the radio wave receiving unit receives radio waves with a field intensity exceeding a predetermined threshold, as the equipment located in the vicinity of the information processing apparatus.

The information processing program may cause the computer to further function as a list output unit for outputting a list indicating field intensities of radio waves transmitted by the respective pieces of the equipment.

The association unit may associate the equipment with the installation location by linking and accumulating, in a database, the identification information of the equipment and the information indicating the installation location.

The information processing program may cause the computer to further function as a map output unit for outputting a map on which an installation location of equipment can be specified, and the installation location designating unit may designate the location designated by being indicated on the map, as the installation location of the equipment.

The use of a map to allow a user to designate an installation location enables the user to register the installation location of the equipment with a simpler and less troublesome task.

The aforementioned equipment is equipment which can be installed on a movable body, and the installation location designating unit may designate a movable body on which the equipment is installed, as the installation location of the equipment, and the association unit may associate the equipment with the installation location by linking and registering identification information of the equipment and information indicating the movable body designated by the installation location designating unit.

The aforementioned equipment may be a beacon transmitter having a function to transmit radio waves, and this beacon transmitter may be an access point used in wireless communication (radio communication). In this case, the association unit may associate the equipment with the installation location by linking and registering a physical layer address used in the beacon transmitter and information indicating the installation location.

The information processing program may cause the computer to further function as a message output unit for outputting a message to prompt bringing the information processing apparatus close to the equipment whose installation location is designated by the installation location designating unit.

The present disclosure also can be embodied as a method to be implemented by an information processing apparatus, an information processing system having one or a plurality of information processing apparatuses, or a computer. The present disclosure also can be embodied as a program to be executed by a computer. Further, the present disclosure may be embodied by recording such a program on a recording medium which is readable by a computer, a device, a machine or the like. The recording medium which is readable by a computer or the like refers herein to a recording medium on which information such as data or programs are accumulated by electrical, magnetic, optical, mechanical, or chemical action in such a manner that the information can be read by a computer or the like.

BRIEF DESCRIPTION OF THE DRAWINGS

FIG. 4 shows an example non-limiting diagram showing a configuration of an operation screen displayed on a display device according to the embodiment;

FIG. 6 shows an example non-limiting diagram showing a configuration of an operation screen displayed on the display device and including a message prompting the user to designate an installation location of a beacon transmitter according to the embodiment;

FIG. 8 shows an example non-limiting diagram showing a configuration of an operation screen displayed on the display device in which an specified beacon transmitter is displayed according to the embodiment.

DETAILED DESCRIPTION OF NON-LIMITING EXAMPLE EMBODIMENTS

Exemplary embodiments of the present disclosure will be described with reference to the accompanying drawings. It should be understood that the embodiments described below are only illustrative of the present disclosure, and the present disclosure is not restricted to specific configurations described below. The present disclosure may be embodied by employing an appropriate specific configuration for each of the various embodiments. For example, the present disclosure is also applicable to an information processing program executed by a general computer, an information processing apparatus, an information processing system having one or a plurality of information processing apparatuses, and an information processing method.

<System Outline According To Embodiment>

Figure 1:
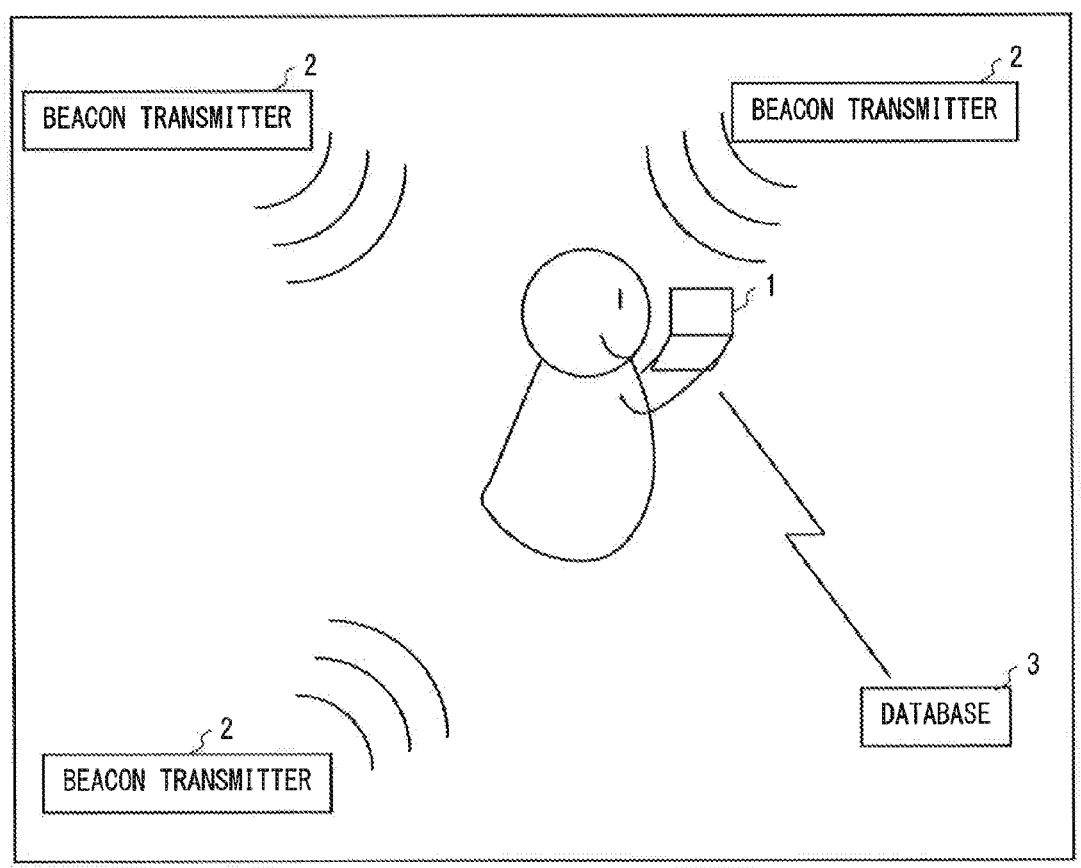
FIG. 1 shows an example non-limiting diagram schematically showing registration of an equipment installation location using an information processing apparatus.

FIG. 1 is a diagram schematically showing registration of installation location of equipment using an information processing apparatus 1 according to this embodiment. Description of this embodiment will be made in terms of an example in which an installation location of a beacon transmitter 2 installed in a premise is registered by using the information processing apparatus 1. Beacon transmitters 2 are installed at various places within this premise to be used by a user who is moving in the premise to know the current position of the wireless communication equipment (not shown) carried by the user.

These beacon transmitters 2 have mutually different identification information, which is used when radio waves transmitted by the beacon transmitters 2 are referred to in order to know the current position of the wireless communication equipment in the premise. Therefore, according to the embodiment, a database 3 is required in which installation location information of the beacon transmitters 2 installed in the premise is associated with the identification information of the beacon transmitters 2. In this embodiment, each of the beacon transmitter is equivalent to an access point which is used for wireless communication of the wireless communication equipment (not shown) carried by the user, but the radio LAN function of which is omitted. The beacon transmitter has a function to periodically transmit radio waves including signals indicating a media access control (MAC) address, a beacon ID, a remaining battery level, and so on. Therefore, according to the embodiment, the MAC address used in communication between the beacon transmitter 2 and the wireless communication equipment is used as identification information of the beacon transmitters 2. However, the identification information of the beacon transmitters 2 can be any as long as the beacon transmitters 2 can be uniquely identified. For example, service set identifier (SSID) or extended service set identifier (ESSID), or basic service set identifier (BSSID) in which a unique name is preset for each of the beacon transmitters 2 may be used as the identification information of the beacon transmitters 2. Alternatively, it is also possible to use uniquely set beacon IDs.

According to the embodiment, an information processing apparatus 1 is used for registering installation locations of the beacon transmitters 2. The user designates an installation location of a beacon transmitter 2 by using an interface of the information processing apparatus 1. The information processing apparatus 1 according to the embodiment is portable by the user. Therefore, the user specifies the designated beacon transmitter 2 by bringing the information processing apparatus 1 to the beacon transmitter 2, and the identification information (MAC address) of the specified beacon transmitter 2 is associated with the designated installation location information. Although the description of the embodiment will be made in terms of an example in which a Nintendo 3DS (registered trademark) device is used as the information processing apparatus 1, the information processing apparatus 1 is not limited to this but may be any information processing apparatus 1 as long as it has a radio wave receiver.

Figure 2:
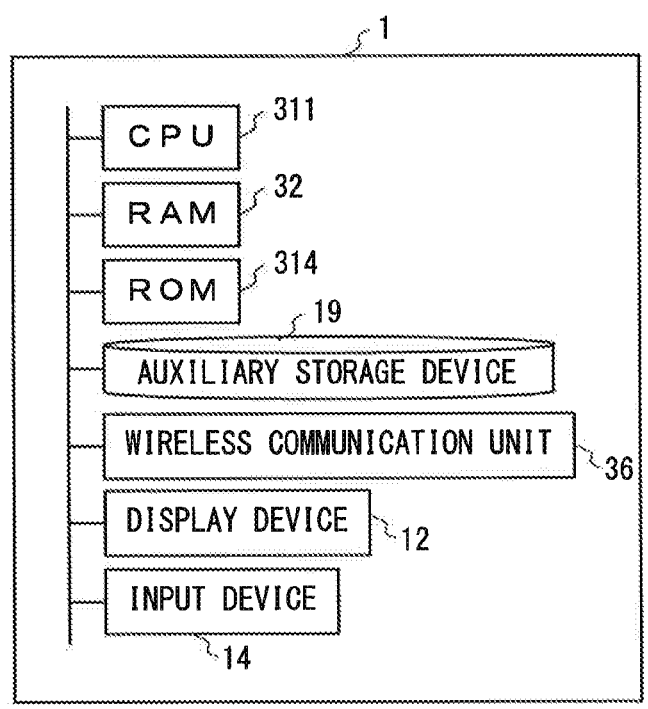
FIG. 2 shows an example non-limiting diagram schematically showing a hardware configuration of an information processing apparatus according to an embodiment.

FIG. 2 is a diagram schematically showing a hardware configuration of the information processing apparatus 1 according to the embodiment. The information processing apparatus 1 has a central processing unit (CPU) 311, a random access memory (RAM) 32, a read only memory (ROM) 314, an auxiliary storage device 19, a wireless communication unit 36 for performing communication with the outside via a network, a display device 12, and an input device 14, which are electrically connected with each other. Specific hardware configuration of the information processing apparatus 1 is not limited to this, and components may be omitted, added or substituted as required depending on how the present disclosure is embodied.

The CPU 311 is a central processing unit, which controls various components provided in the information processing apparatus 1 such as the RAM 32 and the auxiliary storage device 19 by processing commands and data deployed in the RAM 32 and the ROM 314. The RAM 32 is a main storage unit which is controlled by the CPU 311 so that various commands and data are written in and read out. This means that the CPU 311, the RAM 32, and the ROM 314 together constitute a control unit of the information processing apparatus 1.

The auxiliary storage device 19 is a non-volatile storage device which stores information required to be held even after the information processing apparatus 1 is powered off. For example, an operating system (OS) of the information processing apparatus 1, various programs loaded on the RAM 32 and implementing processing to be described later, and various data to be used by the information processing apparatus 1 are written in and read out from the information processing apparatus 1. The auxiliary storage device 19 may be, for example, an electrically erasable programmable ROM (EE-PROM), a hard disk drive (HDD) or the like. Alternatively, a portable medium which is removably mounted on the information processing apparatus 1 may be used as the auxiliary storage device 19. Examples of such portable medium include a memory card having EEPROM or the like, a compact disc (CD), a digital versatile disc (DVD) and a Blu-ray Disc (BD). An auxiliary storage device 19 realized by a portable medium can be used in combination with another auxiliary storage device 19 which is not portable.

The wireless communication unit 36 is a device for transmitting and receiving radio waves in a predetermined frequency band and performing wireless communication with the beacon transmitters 2. While the wireless communication unit transmits and receives radio waves in this embodiment, it corresponds to a radio wave receiving unit of the present disclosure radio waves in terms of the fact that it receives radio waves. In this embodiment, IEEE802.11 that is a standard for so-called wireless LAN is used as the standard for wireless communication with the beacon transmitters 2. It should be understood, however, that other standard may be employed as the communication standard used for the wireless communication.

Figure 3:
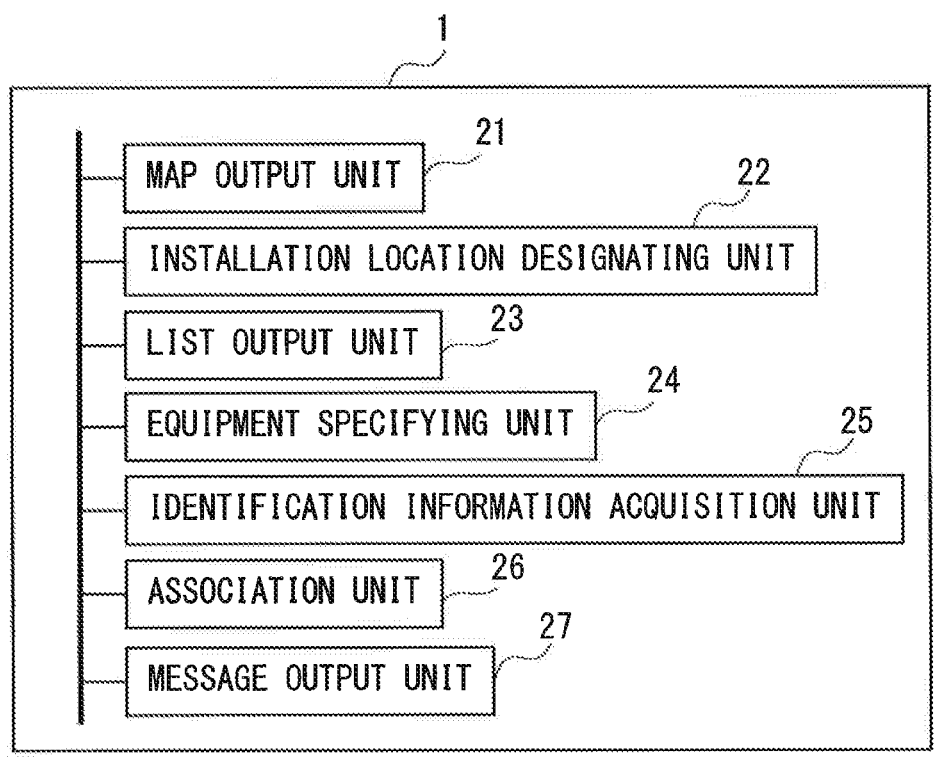
FIG. 3 shows an example non-limiting diagram schematically showing a functional configuration of the information processing apparatus according to the embodiment.

Next, functions of the information processing apparatus 1 according to this embodiment will be described. FIG. 3 is a diagram schematically showing a functional configuration of the information processing apparatus 1 according to this embodiment. The information processing apparatus 1 according to the embodiment is caused, by the CPU 311 interpreting and executing various programs deployed in the RAM 32, to function as the information processing apparatus 1 having a map output unit 21, an installation location designating unit 22, a list output unit 23, an equipment specifying unit 24, an identification information acquisition unit 25, an association unit 26, and a message output unit 27.

The map output unit 21 outputs a map for allowing the user to designate an installation location, and the installation location designating unit 22 receives a designating operation performed by the user referring to the map and thereby designates the installation location of the beacon transmitter 2. A list of the beacon transmitters 2 relating to radio waves received by the wireless communication unit is output by the list output unit 23, and the equipment specifying unit 24 specifies a beacon transmitter 2 to be registered based on intensities of the radio waves. The association unit 26 links the MAC address of the beacon transmitter 2 acquired by the identification information acquisition unit 25 to information on the installation location designated by the installation location designating unit 22, whereby the beacon transmitter 2 is associated with the installation location. Although the description of this embodiment has been made in terms of an example in which all these functions are executed by the general-purpose CPU 311, some or all of these functions may be realized by a single or a plurality of dedicated processors.

FIG. 4 is a diagram showing a configuration of an operation screen displayed on the display device 12 in this embodiment. There is displayed, in an upper half of the operation screen, information on wireless LAN radio waves of the respective beacon transmitters 2 which are output by the list output unit 23 and currently received by the wireless communication unit, and this information is displayed such that the beacon transmitters 2 are arranged in descending order of the intensity of the radio waves. Hereinafter, the list displayed in the upper half of the operation screen shall be referred to as the "beacon transmitter list". The information displayed in the beacon transmitter list includes field intensities of the radio waves received by the beacon transmitter 2 (indicated in the column of "Rs" in FIG. 4), wireless LAN channels (indicated in the column of "CH" in FIG. 4), MAC addresses of the beacon transmitters 2 (indicated in the column of "MAC" in FIG. 4), beacon IDs (indicated in the column of "BcnID" in FIG. 4), and remaining battery levels of the beacon transmitters 2 (indicated in the column of "BAT" in FIG. 4).

There is displayed, in a lower half of the operation screen, a map of the premise (layout plan) where the beacon transmitter registration task in the embodiment is to be carried out, and the map is output by the map output unit 21. The map thus displayed is a map on which installation locations of the beacon transmitters 2 can be designated. There are displayed on the map the beacon transmitters 2 which are already registered in the form of icons representing antennas. In addition, there are displayed, on the map, a button for switching display portions of the map, a button for switching floors to be displayed on the map, a button for scaling the map, a button for outputting an information file of registered beacon transmitters, a button for instructing termination of equipment installation location registration processing, a button for new registration of a beacon transmitter 2. The user is enabled to perform various operations by operating these buttons. For example, the user is able to start the equipment installation location registration processing to be described later by operating the button for new registration of a beacon transmitter 2.

<Flow of Processing>

Flow of the processing performed in this embodiment will be described. It should be noted that details of the processing and the sequence of processing steps shown in the flowchart according to the embodiment are only an example for embodying the present disclosure. Specific details of the processing and sequence of the processing steps may be selected as appropriate depending on how the present disclosure is embodied.

Figure 5:
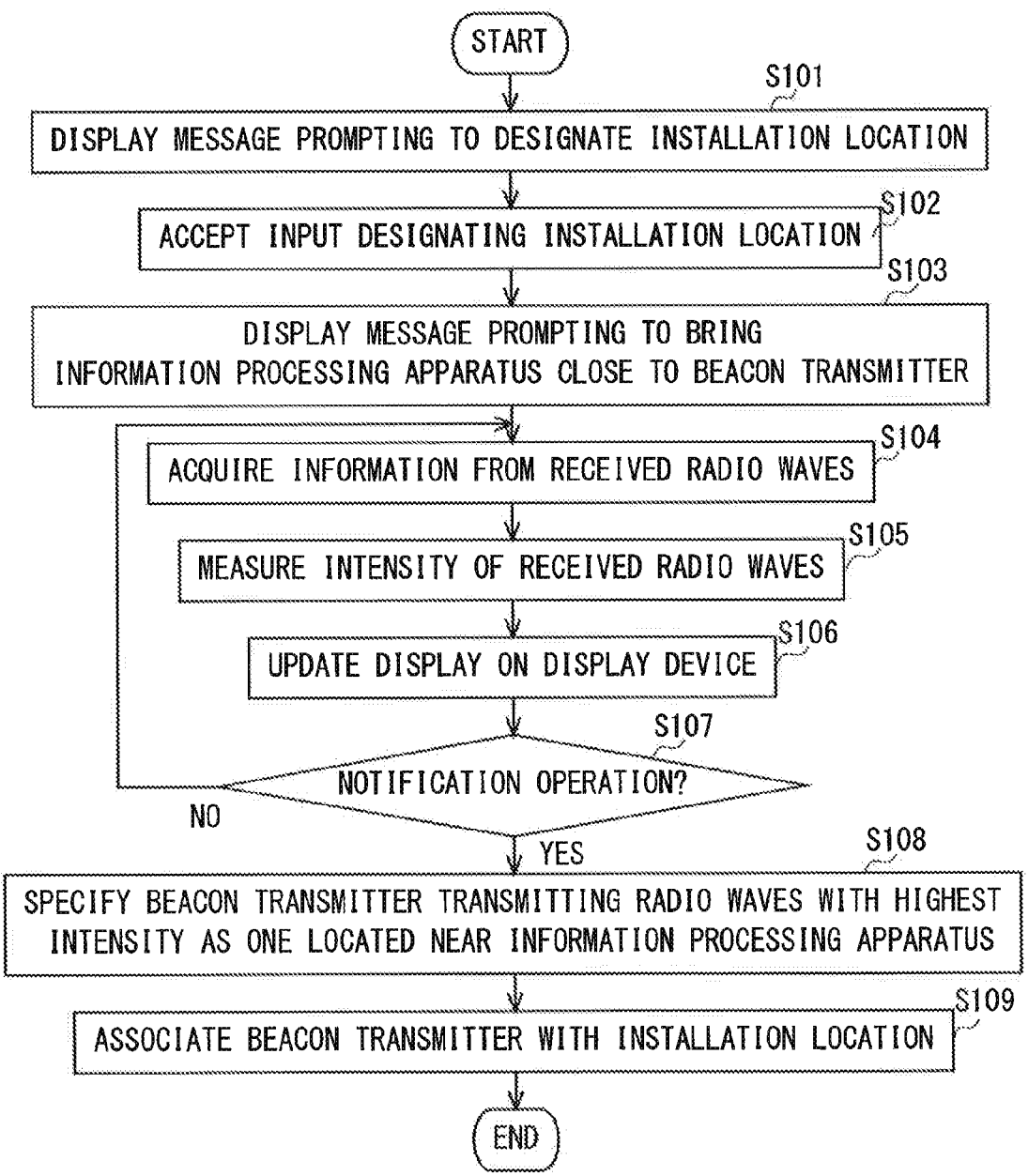
FIG. 5 shows an example non-limiting flowchart showing flow of processing for equipment installation location registration according to the embodiment.

FIG. 5 is a flowchart showing flow of equipment installation location registration processing according to this embodiment. The equipment installation location registration processing shown in this flowchart is started and performed by the user operating the button for new registration of a beacon transmitter 2, with the above-described operation screen being displayed.

In step S101, a message prompting the user to designate an installation location of a beacon transmitter 2 is displayed. Once the user's operation of the button for new registration of a beacon transmitter 2 is accepted, the message output unit 27 outputs to the display device 12 a message prompting the user to designate an installation location of a beacon transmitter 2, and causes the display device 12 to display this message.

FIG. 6 is a diagram showing a configuration of an operation screen displayed on the display device 12 in the embodiment, and including a message prompting the user to designate an installation location of the beacon transmitter 2. In this embodiment, a message saying "AP/beacon installation: AP/beacon information is installed at a designated place" is displayed in the upper half of the operation screen, and further a message saying "Designate a place to install" is displayed as the message to prompt the user to designate an installation location of the beacon transmitter 2. Once these messages are displayed, the processing proceeds to step S102.

In step S102, an input for designating an installation location of the beacon transmitter 2 is accepted. In response to the message displayed in step S101 to prompt the user to designate an installation location of the beacon transmitter 2, the user performs operation to designate a position, on the map displayed in the lower half of the operation screen, corresponding to the installation location of the beacon transmitter 2. This operation may be performed for example by means of a pointing device such as a touch panel provided in the display device 12. The installation location designating unit 22 designates the place according to the position on the map designated by the user as the installation location of the beacon transmitter 2 in the premise. The processing then proceeds to step S103.

In step S103, a message is displayed to prompt the user to bring the information processing apparatus 1 close to the beacon transmitter 2. When an input by the user to designate the installation location is accepted, the message output unit 27 outputs a message to prompt the user to bring the information processing apparatus 1 close to the beacon transmitter 2 to be registered, and causes the display device 12 to display this message.

Figure 7:
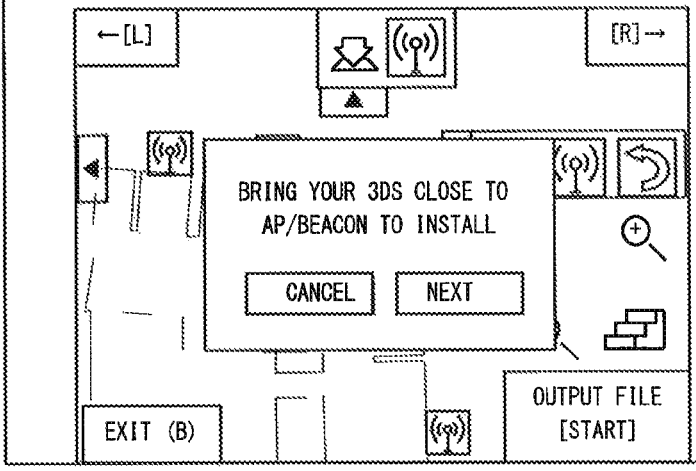
FIG. 7 shows an example non-limiting diagram showing a configuration of an operation screen displayed on the display device and including a message prompting the user to bring the information processing apparatus closer to the beacon transmitter according to the embodiment.

FIG. 7 is a diagram showing a configuration of the operation screen displayed on the display device 12 according to this embodiment, and the operation screen includes a message to prompt the user to bring the information processing apparatus 1 to the beacon transmitter 2. In this embodiment, a message saying "Bring your 3DS close to the AP/beacon to install" is displayed in the lower half of the operation screen as the message to prompt the user to bring the information processing apparatus 1 close to the beacon transmitter 2. In addition to this message, there are displayed a notification button for performing operation to notify that the user has brought the information processing apparatus 1 close to the beacon transmitter 2 ("NEXT" button in FIG. 7), and a termination button for stopping and terminating the equipment installation location registration processing ("CANCEL" button in FIG. 7). Once the message is displayed, the processing proceeds to step S104.

In steps S104 to S106, information is acquired from the received radio waves and intensity of the received radio waves is measured, and the display on the display device 12 is updated. In this embodiment, the wireless communication unit continuously receives radio waves from the beacon transmitter 2. The identification information acquisition unit 25 acquires information for each of the beacon transmitters 2 from the received radio waves (step S104). The information thus acquired contains MAC addresses and beacon IDs as the identification information of the beacon transmitters 2 displayed on the operation screen. The wireless communication unit further measures a field intensity of the received radio waves for each of the beacon transmitters 2 which have transmitted the radio waves (step S105).

The list output unit 23 then updates the contents of the beacon transmitter list displayed in the upper half of the operation screen according to the information acquired in step S104 and the measurement result obtained in step S105 (step S106). As mentioned in the description of FIG. 4, the information for the respective beacon transmitters 2 is displayed in descending order of the field intensity measured in step S105. Thereafter, the processing proceeds to step S107.

In step S107, it is determined whether or not notification operation is has been performed. Specifically, the information processing apparatus 1 determines whether or not the user's operation (notification operation) of the notification button (the "NEXT" button in FIG. 7) has been accepted. According to the message prompting the user to bring the information processing apparatus 1 to the beacon transmitter 2 (see FIG. 7), the use brings the information processing apparatus 1 close to the beacon transmitter 2 and operates the notification button. When it is determined that the notification operation has not been accepted, the processing proceeds to step S104. Specifically, in the equipment installation location registration processing according to the embodiment, the acquisition of information of the radio waves received by the wireless communication unit (step S104), the measurement of field intensity (step S105), and the updating of the display (step S106) are repeated until the notification operation is performed by the user. When it is determined that the notification operation has been accepted, the processing proceeds to step S108.

In step S108, the beacon transmitter 2 is specified. The equipment specifying unit 24 specifies the beacon transmitter 2 that is located in the vicinity of the information processing apparatus 1 based on the field intensity of the radio waves received by the wireless communication unit. In this embodiment, the equipment specifying unit 24 specifies the beacon transmitter 2, from which the radio waves with the highest field intensity are received at the time when the notification operation in step S107 is accepted, as the one located in the vicinity of the information processing apparatus 1. The equipment specifying unit 24 then specifies the MAC address and the beacon ID of the beacon transmitter 2 from which radio waves with the highest field intensity are received, and causes the display device 12 to display them, so that the user is allowed to check the contents of the information to be registered.

FIG. 8 is a diagram showing a configuration of an operation screen displayed on the display device 12 according to this embodiment, in which the designated beacon transmitter 2 is displayed. In this embodiment, there are displayed in the lower half of the operation screen the beacon IDs of the beacon transmitters 2 in descending order of the field intensity at the time when the notification operation is accepted in step S107, while the beacon ID of the beacon transmitter 2 exhibiting the highest field intensity is selectively highlighted, so that the user is allowed to check the contents of the information to be registered. However, the information displayed for this purpose may be MAC addresses. As described above, there is displayed in the upper half of the operation screen, information for the respective beacon transmitters 2 in descending order of the field intensity currently received. Therefore, if the order of the beacon transmitters 2 based on the current field intensity varies after the beacon transmitter 2 with the highest field intensity is specified by the equipment specifying unit 24, the order displayed in the upper half of the operation screen (the order in the current field intensity) is possibly different from the order displayed in the lower half of the operation screen (the order in the field intensity when the equipment is specified) (see the example shown in FIG. 8).

Further, according to this embodiment, there is also displayed a message saying "Select AP/beacon to install", so that the user is allowed to select a beacon transmitter 2 based on the beacon ID. This enables the user to change the beacon transmitter 2 to be associated with the installation location designated in step S102, from the beacon transmitter 2 with the highest field intensity to another beacon transmitter 2. The user confirms the beacon transmitter 2 to be registered in association with the installation location information by performing predetermined confirmation operation (in this embodiment, operation to confirm the beacon transmitter 2 that is selectively highlighted in the display shown in FIG. 8). Once the confirmation operation is accepted, the processing proceeds to step S109.

In step S109, the beacon transmitter 2 and the installation location are associated with each other. The association unit 26 associates the beacon transmitter 2 specified by the equipment specifying unit 24 with the installation location designated by the installation location designating unit 22. In this embodiment, this association is performed by linking and registering the MAC address of the beacon transmitter 2 and the installation location information indicating the installation location.

More specifically, according to this embodiment, the association unit 26 links the MAC address of the beacon transmitter 2 to the information indicating the installation location and temporarily stores them in the auxiliary storage device 19. When the MAC address of the beacon transmitter 2 and the information indicating the installation location are stored in the auxiliary storage device 19, the information processing apparatus 1 causes the display device 12 to display an operation screen containing an icon representing the added beacon transmitter 2.

Figure 9:
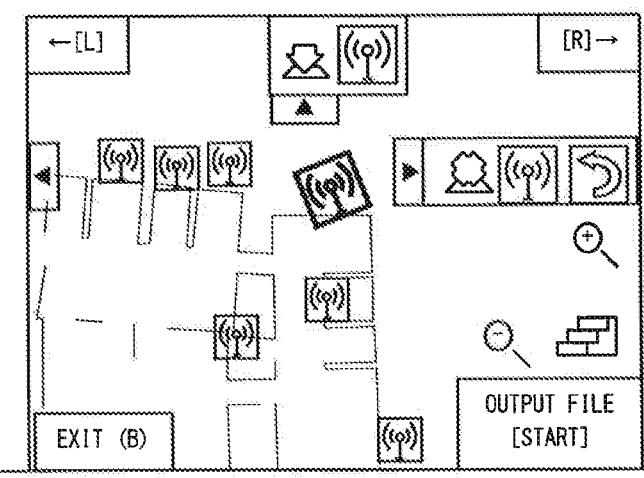
FIG. 9 shows an example non-limiting diagram showing a configuration of an operation screen displayed on the display device, including an icon indicating an added beacon transmitter, according to the embodiment.

FIG. 9 is diagram showing a configuration of the operation screen displayed on the display device 12 according to this embodiment, and the operation screen contains the icon representing the added beacon transmitter 2. According to this embodiment, the icon representing the added beacon transmitter 2 is displayed at the position designated in step S102 on the map displayed in the lower half of the operation screen. In the example shown in FIG. 9, the icon of the newly added beacon transmitter 2 is displayed in a greater size than the other icons and at a tilt.

When it is detected that the information processing apparatus 1 is placed on a battery charger (not shown) after the MAC address of the beacon transmitter 2 and the information indicating the installation location are stored in the auxiliary storage device 19, the association unit 26 retrieves the information stored in the auxiliary storage device 19, and transmits it to the database 3, so that the information is accumulated in the database 3.

While the flow of the equipment installation location registration processing according to the embodiment has been described, the confirmation processing of step S108 can be omitted if it is desired to save the user's time and efforts. When the confirmation processing shown in step S108 is omitted, the user is saved from the need to perform the operation to confirm the beacon transmitter 2 to be registered, and is enabled to register the equipment installation location through only three actions (or operations), namely, the operation to designate the installation location (step S102), the action to bring the information processing apparatus 1 close to the beacon transmitter 2, and the notification operation (step S107).

Further, in place of the processing shown in steps S107 and S108 in FIG. 5, processing may be employed to specify a beacon transmitter 2 which transmits radio waves with a field intensity exceeding a predetermined threshold as the beacon transmitter 2 present in the vicinity of the information processing apparatus 1. When employing such processing, the information processing apparatus 1 is enabled to automatically detect that it has sufficiently approached to the beacon transmitter 2. Accordingly, the user is saved from both the notification operation and the confirmation operation, and the user is enabled to perform registration of the equipment installation location by only two actions of the operation to designate the installation location (step S102) and the action of bringing the information processing apparatus 1 close to the beacon transmitter 2.

VARIATIONS OF THE EMBODIMENT

Variations applicable to the embodiment described above will be described.

Although the description of the embodiment above has been made in terms of an example in which the installation location of a beacon transmitter 2 installed in a premise is registered, the equipment whose installation location can be registered with use of the information processing apparatus 1 according to the present disclosure is not limited to the beacon transmitters 2 installed in the premise. The information processing apparatus 1 according to the present disclosure may be used for registration of an installation location of a beacon transmitter that can be attached to a movable body such as an amusement park ride car (that is, an identifier of the car). In this case, the beacon transmitter is used to know which position in the attraction site of the amusement park the car is running.

The configuration of the information processing apparatus 1 and the flow of the equipment installation location registration processing are substantially the same as those of the embodiment described above, and therefore description thereof will be omitted. In this example, however, the installation location designating unit 22 designates a car as the installation location of the beacon transmitter. The car can be designated by using a car identifier such as a car number or car name. The association unit 26 then associates the beacon transmitter with the car by linking and registering the identification information of the beacon transmitter to the car identifier designated by the installation location designating unit 22.

In this manner, the user is enabled to designate a car as the installation location of the beacon transmitter with use of an interface of the information processing apparatus 1, to specify the designated beacon transmitter by bringing the information processing apparatus 1 close to the beacon transmitter, and to link the identification information (MAC address or beacon ID) of the specified beacon transmitter to the designated car identifier.

Although the description of the embodiment above has been made in terms of an example in which the installation location of the beacon transmitter 2 is registered with a radio LAN function being omitted from the access point, the present disclosure is not limited to this. The information processing apparatus 1 according to the present disclosure can be used to register the installation location of equipment such as an access point that is used for wireless communication of wireless communication equipment (not shown) carried by the user.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A computer-readable non-transitory medium on which is recorded an information processing program having instructions, which when executed by an information processing apparatus including an input device, a display device and a radio wave communication unit to causes the information processing apparatus to function as an equipment installation location registration apparatus and perform operations as:

an equipment installation location designating unit which prompts a user via the display device to designate via the input device an installation location of one or more pieces of equipment that are detectable via received radio waves transmitted by the equipment;

an equipment specifying unit which specifies particular pieces of equipment differently based upon a field intensity of radio waves received by the radio wave receiving unit;

an equipment association unit which associates particular pieces of equipment specified by the equipment specifying unit with an installation location designated by the installation location designating unit; and an identification information acquisition unit which acquires identification information of the equipment, wherein the association unit associates the equipment with the installation location by linking, registering and accumulating in a database the identification information of the equipment and information indicating the installation location.

2. The computer-readable non-transitory medium on which is recorded an information processing program according to claim 1, wherein the identification information acquisition unit acquires the identification information of the equipment from a signal included in the radio waves transmitted by the equipment.

3. The computer-readable non-transitory medium on which is recorded an information processing program according to claim 1, wherein the equipment specifying unit specifies equipment located in the vicinity of the information processing apparatus based on the field intensity.

4. The computer-readable non-transitory medium on which is recorded an information processing program according to claim 3, wherein the equipment specifying unit specifies equipment from which the radio wave receiving unit receives radio waves with the highest field intensity, as the equipment located in the vicinity of the information processing apparatus.

5. The computer-readable non-transitory medium on which is recorded an information processing program according to claim 3, wherein the equipment specifying unit specifies equipment from which the radio wave receiving unit receives radio waves with a field intensity exceeding a predetermined threshold, as the equipment located in the vicinity of the information processing apparatus.

6. The computer-readable non-transitory medium according to claim 1, including instructions for causing the information processing apparatus to perform further operations and further function as a list output unit which outputs a list indicating field intensities of radio waves transmitted by the equipment for respective pieces of the equipment.

7. The computer-readable non-transitory medium according to claim 1, including instructions for causing the information processing apparatus to perform further operations and further function as a map output unit which outputs an equipment configuration map on the display device on which an installation location of equipment is designated via the input device by the user, and wherein the equipment installation location designating unit sets the particular location designated on the map by the user via the input device as the installation location of the equipment.

8. The computer-readable non-transitory medium according to claim 1, wherein:

a piece of equipment is installed on a movable body;
the installation location designating unit designates a movable body on which said piece of equipment is installed as an installation location for said piece of equipment; and
the equipment association unit associates said piece of equipment with the installation location by linking and registering identification information corresponding to said piece of equipment and information indicating the movable body designated by the installation location designating unit.

9. The computer-readable non-transitory medium according to claim 1, wherein each piece of equipment includes a beacon transmitter having a function to transmit radio waves.

10. The computer-readable non-transitory medium according to claim 9, wherein the beacon transmitter is an access point used for wireless communication.

11. The computer-readable non-transitory medium according to claim 9, wherein the association unit associates each piece of equipment with an installation location by linking and registering a physical layer address used in the beacon transmitter and information indicating a particular installation location.

12. The computer-readable non-transitory medium according to claim 1, including instructions for causing the information processing apparatus to further function as a message output unit for outputting a message to prompt a user to bring the equipment installation location registration apparatus close to the particular piece of equipment whose installation location is being designated by the installation location designating unit.

13. An equipment installation location registration apparatus, comprising:

a hardware information processing unit, an input device, a display device and a radio wave receiving unit, wherein the hardware information processing unit of the equipment installation location registration apparatus is configured to perform operations and function as:

an equipment installation location designating unit configured to prompt a user via the display device to designate via the input device an installation location of one or more pieces of equipment that are detectable via received radio waves transmitted by the equipment;

an equipment specifying unit which specifies particular pieces of equipment differently based upon a field intensity of radio waves received by the radio wave receiving unit;

an equipment association unit which associates the particular pieces of equipment specified by the equipment specifying unit with an installation location designated by the installation location designating unit; and an identification information acquisition unit which acquires identification information of the equipment, wherein the association unit associates the equipment with the installation location by linking, registering and accumulating in a database the identification information of the equipment and information indicating the installation location.

14. The equipment installation location registration apparatus according to claim 13, wherein the equipment installation location registration apparatus is portable.

15. An equipment installation location registration system, comprising:

a hardware information processing unit, an input device, a display device and a radio wave receiving unit, wherein the hardware information processing unit of the equipment installation location registration system is configured to perform operations and function as:

an equipment installation location designating unit configured to prompt a user via the display device to designate via the input device an installation location of one or more pieces of equipment that are detectable via received radio waves transmitted by the equipment;

an equipment specifying unit which specifies particular pieces of equipment differently based upon a field intensity of radio waves received by the radio wave receiving unit;

an equipment association unit which associates particular equipment specified by the equipment specifying unit with an installation location designated by the equipment installation location designating unit; and an identification information acquisition unit which acquires identification information of the equipment, wherein the association unit associates the equipment with the installation location by linking, registering and accumulating in a database the identification information of the equipment and information indicating the installation location.

16. An equipment installation location registration method executed by a computer of an information processing apparatus having at least one hardware information processing unit, an input device, a display device and a radio wave receiving unit, the equipment installation location registration method comprising:

prompting a user via the display device to designate via the input device a particular installation location of one or more pieces of equipment that are detectable via received radio waves transmitted by the equipment;

specifying particular pieces of equipment differently based upon a field intensity of radio waves received by the radio wave receiving unit; and associating each of the differently specified pieces of equipment with a particular installation location as designated by the user;

acquiring identification information of the equipment via the radio waves transmitted by the equipment; and associating the equipment with a designated installation location by linking, registering and accumulating in a database the identification information of the equipment and information indicating the designated installation location.

* * * * *